Oct. 4, 1966 M. J. GELPI ET AL 3,277,472
LIGHTWEIGHT RADAR EQUIPMENT
Filed Jan. 14, 1965 2 Sheets-Sheet 1

INVENTORS
MAURICE J. GELPI
JACQUES H. PESSIN
BY
ATTYS.

INVENTORS
MAURICE J. GELPI
JACQUES H. PESSIN
ATTYS.

United States Patent Office 3,277,472
Patented Oct. 4, 1966

3,277,472
LIGHTWEIGHT RADAR EQUIPMENT
Maurice J. Gelpi, Catonsville, and Jacques H. Pessin, Ellicott City, Md., assignors, by mesne assignments, to the United States of America as represented by the Secretary of the Navy
Filed Jan. 14, 1965, Ser. No. 425,646
13 Claims. (Cl. 343—11)

This invention relates to lightweight radar apparatus, and more particularly to radar equipment which can readily be employed by military forces during "brush fire" type conflicts or short duration "police actions" where long life and high reliability of equipment are secondary in importance to high mobility and reduced erection time.

It is one important object of this invention to provide an improved lightweight radar apparatus which can be provided to military forces in a compact, easily carried package.

It is another object of the invention to provide lightweight radar equipment which can be readily erected in the field and placed in operation in a minimum of time.

As another object this invention aims to provide radar equipment of the foregoing character the manufacturing costs of which will be sufficiently low as to permit the equipment to be supplied on a single use or expendable basis necessary to effective operation of highly mobile combat operations.

Yet another object of the invention is the provision of lightweight, mobile, and effective radar apparatus for field use and which is capable of operation under severe environmental conditions of weather and combat.

Still another object of this invention is the provision of a novel radar apparatus comprising a tubular radar mast and radar electronic equipment forming part of the apparatus and rotatably mounted at least partially within the mast, the interior of the mast being of such dimensions as to accommodate, wire stays, ground anchors, wave guide, and the like, so that the mast serves as a carrying container for those elements necessary for assembly and erection of an operable field station.

Other objects, advantages and novel features of the invention will become apparent from the following detailed description of the invention when considered in conjunction with the accompanying drawings wherein.

Figure 1:
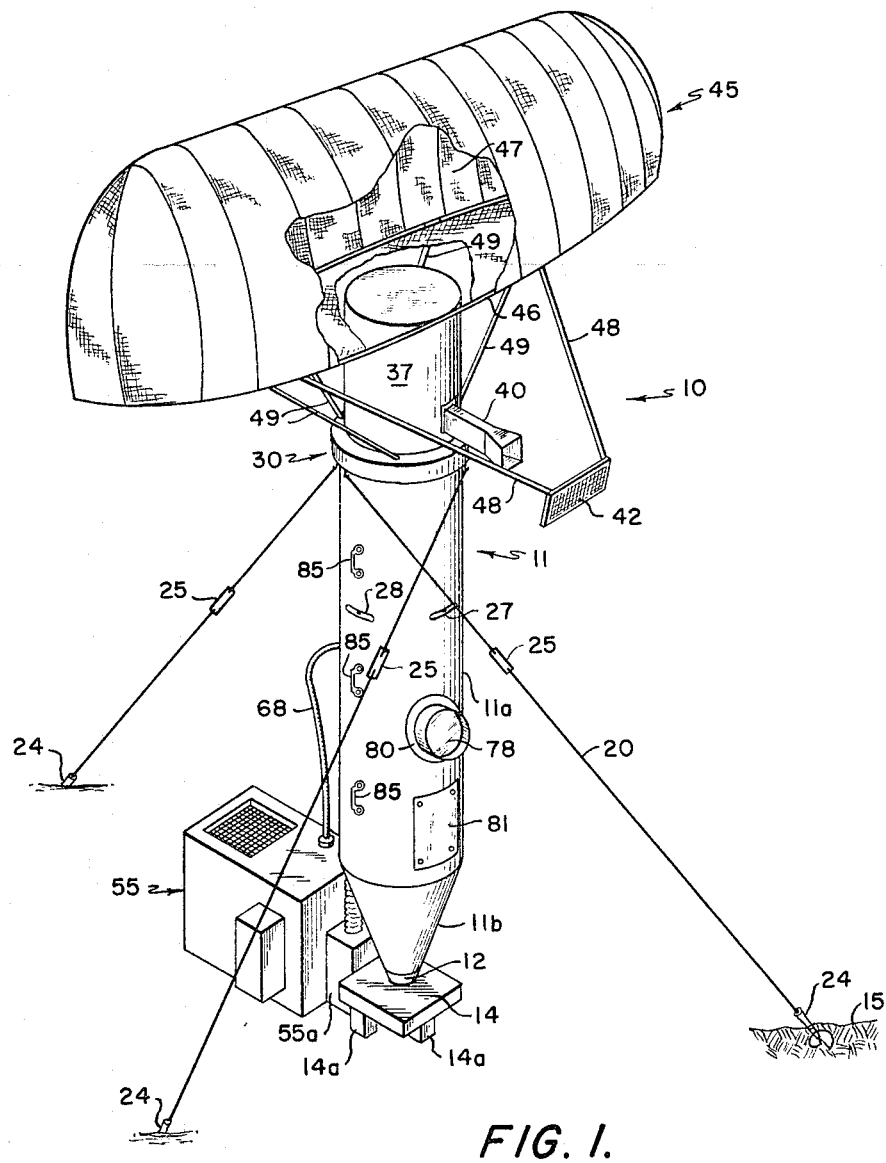
FIG. 1 is a perspective view of a lightweight radar apparatus embodying the invention.

In the form of the invention illustrated in the drawings and described hereinafter, there is provided a lightweight radar apparatus generally indicated at 10, and which is shown in its assembled condition ready for use. The radar apparatus 10 comprises a tubular mast generally indicated at 11 and including an upper cylindrical portion 11a and a lower tapered or conical portion 11b. The walls of the mast 11 are formed of a lightweight structural material such as aluminum or paper honeycomb sandwich which provides a considerable amount of strength per unit weight. The cylindrical portion 11a of the radar mast, in the present example, has a diameter of approximately 2 feet and the mast is approximately 9 feet in overall length.

Figure 2:
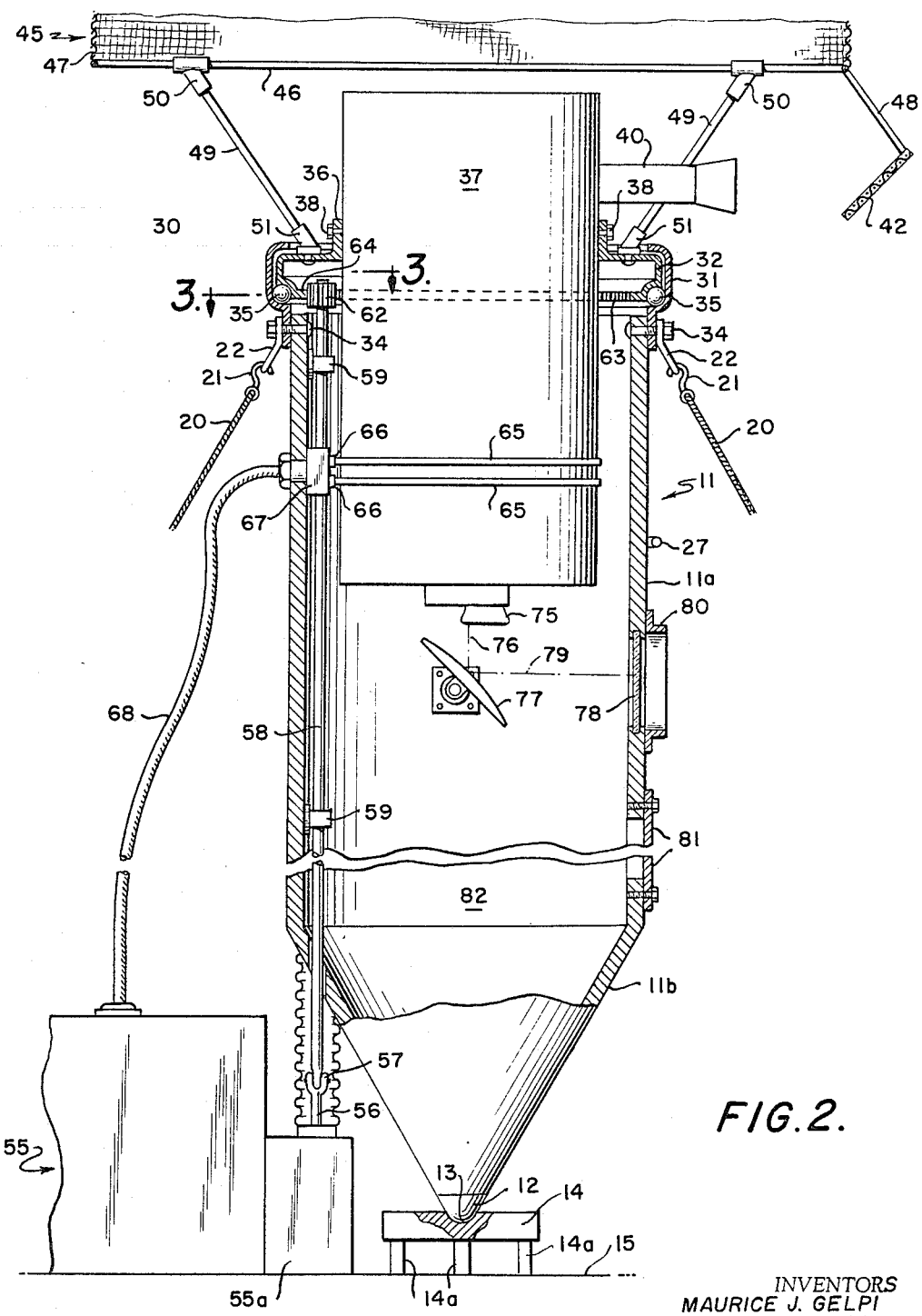
FIG. 2 is a vertical sectional view, with some parts broken out, of the apparatus of FIG. 1.

The tip of the conical portion 11b is provided with a generally hemispherical cap 12 which is formed of sheet metal or the like and is adapted to be received in a complementary socket 13 of a base plate 14 as is best illustrated in FIG. 2. The plate 14 is conveniently provided with three legs 14a so that it will assume a stable condition on a supporting area of ground 15. The cap 12 and base plate 14 provide a ball and socket joint for the radar mast 11 so that the latter may be erected to a vertical position irrespective of sloping conditions of the ground 15.

The mast 11 is held in a vertical position by stays 20 which are connected by hooks 21 to eye plates 22 at the upper end of the mast 11. The stays 20 are connected at their lower ends to suitable ground anchors 24 which may preferably be of the auger type as illustrated. The stays comprise turnbuckles 25 by which their effective length may be adjusted to bring the antenna mast 11 to a truly vertical position as indicated by a pair of spirit levels 27 and 28 mounted on the side wall of the antenna mast 11 at right angles to one another.

It will be noted that the stays 20 are arranged so as to extend generally tangential to the surface of the mast 11, and in crossing relation to one another. The stays 20 thereby oppose tendencies of the mast 11 to rotate about its vertical axis under torsional forces resulting from rotation of radar components supported by the mast in a manner which will become apparent as the description proceeds.

Mounted at the upper end of the mast 11 is an annular bearing means, generally indicated at 30, and including an outer race 31 and an inner race 32. The outer race 31 is secured to the wall of the mast 11 by fastening means such as bolts 34 which the previously mentioned eye plates 22 conveniently secured by the same fastening means. The inner race 32 is spaced from the outer race 31 by suitable friction reducing ball bearings 35 or the like.

The inner race 32 is provided with an upstanding flange or sleeve 36 which receives a cylindrical housing 37 containing radar transmitting and receiving electronic equipment, the housing being secured to the sleeve 36 as by suitable screws 38. The upper portion of the housing 37 contains a magnetron which is directly connected to a duplexer 40 which, for considerations of lightness in weight and minimizing of costs, advantageously comprises a molded plastic wave guide having a metalized lining or interior. The duplexer 40 which extends radially from the cylindrical housing 37, is aimed to direct energy at and receive energy from a reflecting screen 42. The reflecting screen 42 reflects the energy to and from a radar antenna 45 which is of an inflatable type.

The antenna 45, which preferably comprises a cloth or paper bag structure having an oval aluminum base frame 46, is inflatable to assume a predetermined shape and has a metallic coated energy reflecting inner surface 47 disposed to cooperate with the reflector screen 42 to provide a desired energy pattern. The reflector 42 is supported at a desired angle below the antenna by arms 48 extending from the antenna frame 46.

The oval frame 46 is supported by a plurality of struts 49 the upper and lower ends of which are snugly received in sockets 50 and 51 secured to the frame 46 and the upper surface of the inner bearing race 32. Prime mover means are provided for generating low frequency electric current for energizing the radar and for rotating the inner bearing race 32, the supported housing 37 and equipment contained therein, and the antenna 45. In the present example the prime mover comprises a gas turbine powered generator generally indicated at 55 which includes motive power take-off means comprising reduction gearing housed in section 55a and having a vertically orientated output shaft 56. The speed and direction of rotation of the shaft 56 is preferably variable by control means (not shown).

Figure 3:
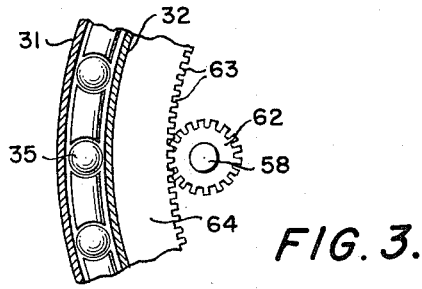
FIG. 3 is an enlarged fragmentary sectional view taken substantially along line 3—3 of FIG. 2.

The output shaft 56 is connected by means of a suitable universal joint or other coupling 57 to the lower end of the drive shaft 58 which projects from the conical section 11b of the mast and is rotatably supported in aligned bearing blocks 59 which are secured to the inner surface of the cylindrical section 11a of the mast. Secured to the upper end of the vertical drive shaft 58 is a drive pinion 62 which is in meshing engagement with teeth 63 formed on the inner edge of a flange 64 of the inner race 32 of bearing 30 as is best illustrated in FIG. 3.

The radar electronic apparatus contained in the housing 37 is supplied with low frequency electrical power through the agency of a pair of slip rings 65 which cooperate with brushes 66 mounted on the inner surface of the wall of the mast 11 by suitable through-wall connector means 67. The connector means 67 provides releasable connection to a flexible power cable 68 leading from the turbine powered electric generator 55.

Mounted at the lower end of the housing 37 for rotation therewith is a cathode ray tube 75 which presents the output of the radar receiver means in the form of a suitable sweep such as an intensity modulated sweep on the x-axis only. The cathode ray tube 75 is mounted in a downwardly facing position with the zero end of the sweep on the vertical axis of rotation of the housing 37 and tube 75 as indicated at 76. Disposed below the cathode ray tube 75 is a magnifying mirror 77 which is arranged at an angle to the tube so as to project an image of the cathode ray tube face onto a light sensitive phosphorescent screen 78 which is fixed in an opening in the cylindrical portion 11a of tubular mast 11. The mirror 77 is positioned so that the zero end of the cathode ray tube sweep is projected along line 79 to the center of the screen 78, whereby rotation of the tube 75 about axis 76 causes the tube sweep to scan the surface of the screen 78.

The screen 78 has a persistance time approximately equaling the time of one revolution of the antenna 45, so that a continuing plan position indicator (PPI) presentation is provided or maintained on the screen 78 for viewing by the radar operator. Of course, a suitable light-excluding shroud or shield 80 may be provided around the screen 78 for use in daylight.

This combination of a cathode ray tube which rotates as a unit with the antenna and receiver a stationary mirror, and a stationary phosphorescent screen eliminates the need of rotating electrical connections between the receiver portion of the electronic equipment and the cathode ray tube, thereby assuring an efficient, trouble free, and lightweight construction.

Below the screen 78, the sidewall of the mast 11 is provided with an opening which is closed by a removable cover plate 81. Removal of the plate 81 provides access to the interior 82 of the lower part of the mast which is used for storage of disassembled parts of the apparatus 10 during transport of the apparatus to and from a location of use. Thus, the stays 20, base plate 14, ground anchors 24, duplexer 40, electrical cable 68, struts 49, and the like may be conveniently stored within the area 82 of the mast. The antenna 45 and its supporting frame 46 may be collapsed and strapped to the side of the mast 11 to provide a complete and compact package from which the radar apparatus 10 may be quickly assembled and erected and ready for use upon connection to an electrical and motive power supply means such as 55.

The mast 11 is further provided with a plurality of carrying handles 85, by which the apparatus 10 may be conveniently carried as a self-contained package to a desired site for assembly and operation. During such assembly the inflatable antenna 45 may be conveniently inflated for initial installation by using exhaust gas from the turbine powered generator 55, and pressure may be maintained by pressurized gas fed to the interior of the antenna from another source such as from a high pressure flask, not shown, having a suitable pressure reducing regulator.

Because the tubular mast 11 encompasses most of the electronic equipment including the receiver portion thereof, the cathode ray tube 75, and the slip rings and brushes 65, 66, the apparatus 10 is notably well protected against dust and inclement weather. Moreover, the tubular mast 11 insulates the more delicate portions of the equipment from shock during transport, erection, and use.

From the foregoing detailed description it will be appreciated that by reason of the novel constructions and arrangements of parts, the invention has provided an improved lightweight radar apparatus which fulfills the previously mentioned objects and advantages as well as others.

Obviously many modifications and variations of the present invention are possible in the light of the above teachings. It is therefore to be understood that within the scope of the appended claims the invention may be practiced otherwise than as specifically described.

What is claimed is:
1. In a lightweight radar apparatus:
support means;
radar receiving means mounted on said support means for rotation about a predetermined axis;
said receiving means having a cathode ray tube mounted for rotation therewith and adapted to present receiver output as a sweep along a single axis of the tube normal to and originating at said predetermined axis;
a light sensitive phosphorescent screen mounted on said support means; and
means for projecting an image of said sweep on said screen whereby said image scans said screen upon said rotation to provide a P.P.I. presentation.

2. A lightweight radar apparatus comprising:
support means;
radar transmitting, receiving, and antenna means mounted on said support means for rotation together about a predetermined axis;
said receiving means having a cathode ray tube mounted for rotation therewith and adapted to present receiver output as a sweep along a single axis normal to and originating at said predetermined axis;
a light sensitive phosphorescent screen mounted on said support means; and
means for projecting an image of said sweep on said screen whereby said image scans said screen upon said rotation to provide a P.P.I. presentation.

3. Lightweight radar apparatus as defined in claim 2 wherein said support means comprises a vertical tubular mast, said predetermined axis is vertical, said screen lies in a plane parallel to said predetermined axis, and said means for projecting said image comprises reflecting means for effecting a 90 degree change of direction in projecting said image on said screen.

4. Lightweight radar apparatus as defined in claim 3, wherein said screen is larger in radius than the length of said sweep, and said reflecting means projects a magnified image of said sweep.

5. Radar apparatus comprising:
a tubular mast;
means for securing said mast in a vertical position;
annular bearing means at the upper end of said mast;
radar transmitter and receiver means having a major portion extending through said annular bearing means into the interior of said mast and supported by said annular bearing means for rotation about a vertical axis;
antenna means mounted over said transmitter and receiver means for rotation therewith as a unit;
slip ring and brush means disposed between said mast and said transmitter and receiver means for supplying electric power thereto during said rotation; and
drive means for effecting said rotation.

6. Radar apparatus as defined in claim 5, wherein said annular bearing means comprises a first race secured to said mast, a second race connected to said transmitting and receiving means, and said drive means comprises a drive shaft for connection to a prime mover and supported by said mast for rotation, a pinion on said shaft for rotation therewith, and driven gear means on said second race in meshing engagement with said pinion.

7. Radar apparatus as defined in claim 5 and wherein said receiving means has a cathode ray tube mounted for rotation therewith about said vertical axis and adapted to present receiver output as a sweep along an axis normal to said vertical axis and originating thereat; a light sensitive phosphorescent screen mounted on said mast; and means for projecting an image of said sweep on said screen whereby said image scans said screen upon said rotation of said receiving means to provide a P.P.I. presentation.

8. Radar apparatus as defined in claim 7 wherein said screen lies in a vertical plane, and said means for projecting said image comprises reflecting means.

9. Radar apparatus comprising:
a tubular mast terminating in a spherical lower end surface;
a base plate having a socket receiving said spherical lower end surface to form a ball and socket relation with said mast;
adjustable stays for securing said mast in a vertical position and opposing rotation thereof about its vertical axis;
annular bearing means at the upper end of said mast;
radar transmitting and receiving means extending through said bearing means into the interior of said mast and supported by said bearing means for rotation within said mast about said vertical axis; and
said mast having an opening in a sidewall portion thereof and a cover plate closing said opening and removable to gain access to the interior of said mast for storing said base plate, said stays, or the like.

10. Radar apparatus comprising:
a tubular mast having a cylindrical upper portion and a tapered lower portion terminating in a spherical end surface;
a base plate having a socket receiving said spherical end surface to form a ball and socket relation with said mast;
adjustable stays connected between the upper portion of said mast and ground anchors for securing said mast in a vertical position and opposing rotation thereof about its vertical axis;
annular bearing means at the upper end of said mast;
radar transmitting and receiving means extending through said bearing means into the interior of said mast and supported by said bearing means for rotation within said mast about said vertical axis; and
said mast having an opening in a sidewall portion thereof and cover plate secured over said opening and removable to gain access to the interior of said mast as a storage space for said base plate and stays;
antenna means connected to said receiving means for rotation therewith;
slip ring and brush means between said mast and said transmitter and receiver means for supplying electric power thereto during said rotation; and
drive means for effecting said rotation.

11. Radar apparatus as defined in claim 10, wherein annular bearing means comprises a first race secured to said mast, a second race connected to said transmitting and receiving means, and said drive means comprises a drive shaft for connection to a prime mover and supported by said mast for rotation, a pinion on said shaft for rotation therewith, and driven gear means on said second race in meshing engagement with said pinion.

12. Radar apparatus as defined in claim 10, and wherein said receiving means has a cathode ray tube mounted for rotation therewith about said vertical axis and adapted to present receiver output as a sweep along an axis normal to said vertical axis and originating thereat; a light sensitive phosphorescent screen mounted on said mast; and means for projecting an image of said sweep on said screen whereby said image scans said screen upon said rotation of said receiving means to provide a P.P.I. presentation.

13. Radar apparatus as defined in claim 12, wherein said screen lies in a vertical plane, and said means for projecting said image comprises reflecting means.

No references cited.

CHESTER L. JUSTUS, *Primary Examiner.*

P. M. HINDERSTEIN, *Assistant Examiner.*